Sept. 19, 1939.　　　　D. F. SMITH　　　　2,173,668

ELECTRIC WIRE CONNECTING DEVICE

Filed Aug. 30, 1937

Inventor

Donald F. Smith

By Carl Miller

Attorney

Patented Sept. 19, 1939

2,173,668

UNITED STATES PATENT OFFICE 2,173,668

ELECTRIC WIRE CONNECTING DEVICE

Donald Francis Smith, Los Angeles, Calif.

Application August 30, 1937, Serial No. 161,617

1 Claim. (Cl. 174—84)

This invention relates to a connecting device for uniting electric wires or conductors which device is preferably to be referred to as an "insultube".

The principal object of this invention is to provide a connecting device of a tubular character provided with an internal tubular element formed of a ductile metal suitably insulated which element is adapted to receive the adjoining terminal ends of electric wires to permanently unite the same and which connecting device shall take the place of the ordinary twisted junction between electric wires and render the usual junction box unnecessary.

Broadly stated the invention comprises a tube of ductile metal open at each end suitably insulated and covered with a protective sheath which extends beyond the ends of the tube, the ends of the electric wires to be connected being inserted into the ends of the tube with the protective sheath of the device overlapping the protective sheath of the electric wires, the ends of the tube being then deformed by pressure to clamp the same to the ends of the electric wires.

Other objects and advantages of this invention relate to the small cost per unit, speed of installation, permanency, strength, positive grip, positive insulation, avoidance of dirt and sticky tapes, ease of making a connection, no danger of short circuits, no soldering and adaptability for manufacture in various sizes to accommodate any size wire.

In the accompanying drawing illustrating the invention:—

Figure 1:
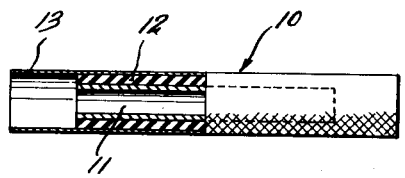
Figure 1 is a side view partly in section of a preferred form of the connecting device.

Referring to the drawing, the connecting device 10 is made up of a length of a ductile metallic tubing 11 preferably of copper and surrounding the same is a layer 12 of insulating material such as rubber extending for the full length of the tube 11. Surrounding the layer of rubber is a protective sheath 13 of a flexible and pliable character, preferably formed of woven rubberized thread or cord in the manner well known in the art, both the protective sheath 13 and intermediate layer of rubber insulation 12 being bonded to each other and said layer of rubber insulation being bonded to the tube 11 to form a preformed single unitary device adapted to be later applied as described. The protective sheath 13 is of a length greater than the length of the tube 11 and extends for an equal distance beyond each end thereof, as clearly shown in Figure 1, for a purpose to be hereinafter described.

The length of the copper tube 11 is made such as to receive in each end thereof the terminal uninsulated end of an electric wire, each to be of an equal length of not less than ½" so that there will be provided a slight space between the opposed ends of the electric wires when such are inserted therein. The overlap of each end of the protective sheath 13 is preferably made of a length substantially equal to half the length of the copper tube 11. To insure best results the internal diameter of the copper tube must be such that the uninsulated terminal ends of the electric wires will snugly fit therein.

Figure 2:
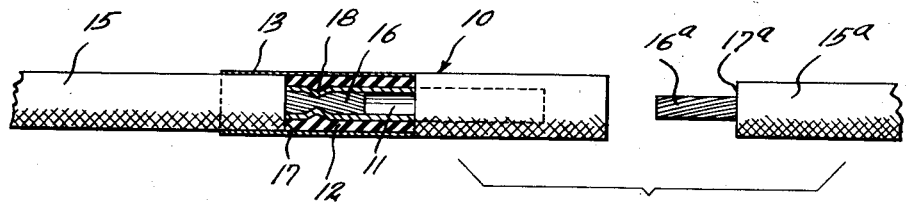
Figure 2 is a side view of the connecting device partly in section showing one of two adjoining electric wires connected thereto.

In connecting the adjoining ends of electric wires by means of the connecting device 10, each end of the electric wires 15 and 15a, see Figure 2 are trimmed to provide a length of uninsulated wire 16, 16a of approximately ½" in length, the shouldered edges 17, 17a being cut smooth and at right angles to the wire. The uninsulated terminal ends 16 and 16a are then twisted and inserted into the open ends of the copper tube 11 with the shouldered edges 17, 17a abutting the ends of the tube 11 and rubber insulation 12, in the manner clearly shown in the left hand part of Figure 2. As the inside diameter of the overlapping ends of the protective sheath 13 is equal to the outside diameter of the electric wire, the same will snugly and frictionally engage the protective sheath of the electric wires 15 and 15a, thus presenting an exceedingly neat and simple construction. To securely lock the connecting device 10 to the uninsulated ends 16, 16a of the electric wires 15, 15a the copper tube 11 is flattened out or crimped at each by the the application of pressure by means of a hammer, pliers or other suitable tool. As shown in Figure 2, the copper tube 11 has been crimped as at 18 so as to securely fasten the wire end 16 thereto.

It is to be understood that the connecting device 10 may be made of various sizes to accommodate different sizes of electric wire. As described above, the manner of applying the connecting device is the acme of simplicity requiring no special tools. Insulating or friction tape is not required to seal and insulate the connection of the electric wires and inasmuch as the connecting device is a unitary element there are no separable parts that could be lost or broken to destroy its suitability for use.

It is to be also understood that various modifications in the details and shape of the connector herein shown and described may be made without departing from the scope of the invention.

Having thus described my invention what I claim as new and desire to secure by Letters Patent is:

The combination of a pair of insulated conductors and means for joining same, said conductors each having one end thereof trimmed to define uninsulated lengths of wire with the edge of the insulation cut normal to said wire to provide shoulders, said means comprising a preformed connector including an inner ductile metal tube, a layer of rubber insulation surrounding said tube for the full length thereof and bonded thereto, and a sheath of flexible material protecting and encasing the layer of rubber and bonded thereto, said sheath having end portions extending beyond the terminal ends of said metal tube to define a pocket at each end of the connector, said uninsulated lengths of wire each being received within an end of said tube with each shoulder abutting an end of the tube and with the insulated portion of each conductor received in a pocket, said tube being swedged to each of said uninsulated lengths of wire.

DONALD FRANCIS SMITH.